United States Patent
Dieterle

(10) Patent No.: US 9,419,343 B2
(45) Date of Patent: Aug. 16, 2016

(54) RADAR BEAM DEFLECTION UNIT FOR A RADAR LEVEL INDICATOR

(71) Applicant: VEGA Grieshaber KG, Wolfach (DE)

(72) Inventor: Levin Dieterle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 73 days.

(21) Appl. No.: 14/456,933

(22) Filed: Aug. 11, 2014

(65) Prior Publication Data
US 2015/0048963 A1  Feb. 19, 2015

(30) Foreign Application Priority Data
Aug. 14, 2013 (EP) ..................................... 13180386

(51) Int. Cl.
*G01S 13/88* (2006.01)
*G01F 23/284* (2006.01)
*H01Q 15/02* (2006.01)
*G01F 23/292* (2006.01)
*G01F 23/296* (2006.01)
*G01S 13/42* (2006.01)
*H01Q 1/22* (2006.01)
*H01Q 3/14* (2006.01)
*H01Q 19/06* (2006.01)

(52) U.S. Cl.
CPC .............. *H01Q 15/02* (2013.01); *G01F 23/284* (2013.01); *G01F 23/292* (2013.01); *G01F 23/296* (2013.01); *G01S 13/42* (2013.01); *G01S 13/88* (2013.01); *H01Q 1/2233* (2013.01); *H01Q 3/14* (2013.01); *H01Q 19/062* (2013.01)

(58) Field of Classification Search
CPC ..... G01S 13/08; G01S 13/88; G01F 25/0069; G01F 23/284; G01F 25/0061; G01F 25/0076; G01F 23/296; G01F 23/292

USPC ........................................................ 342/124
See application file for complete search history.

(56) References Cited

U.S. PATENT DOCUMENTS

| | | | | |
|---|---|---|---|---|
| 4,044,355 A | * | 8/1977 | Edvardsson | G01S 13/343 342/124 |
| 4,094,494 A | * | 6/1978 | Mahr | C21B 7/24 266/183 |
| 4,219,814 A | * | 8/1980 | Johnson | C21B 7/24 266/86 |
| 4,290,067 A | * | 9/1981 | Legille | C21B 7/24 266/92 |
| 4,322,627 A | * | 3/1982 | Pirlet | C21B 7/24 250/236 |
| 4,332,374 A | * | 6/1982 | Kremer | G01S 7/03 266/100 |
| 4,339,664 A | * | 7/1982 | Wiklund | C21B 7/24 250/559.23 |
| 4,745,293 A | * | 5/1988 | Christensen | G01F 23/292 250/227.23 |
| 5,038,147 A | | 8/1991 | Cerro et al. | |

(Continued)

FOREIGN PATENT DOCUMENTS

DE  30 15 006   10/1980
DE  0 071 426   5/1989

(Continued)

*Primary Examiner* — Peter Bythrow
(74) *Attorney, Agent, or Firm* — Fay Kaplun & Marcin, LLP

(57) ABSTRACT

In order to determine the topology of a bulk-material surface, a series of echo curves are measured under different main emission directions of the antenna. The main emission directions are generated using at least one prism, which lies in the beam path of the level indicator and is rotated. It is thereby possible to achieve in a compact design the decoupling of beam generation from mechanical deflection of the main emission direction.

11 Claims, 6 Drawing Sheets

(56) References Cited

U.S. PATENT DOCUMENTS

| | | | | |
|---|---|---|---|---|
| 5,053,775 A * | 10/1991 | Mawhinney | C21B 7/24 | 342/124 |
| 5,053,776 A * | 10/1991 | Mawhinney | C21B 7/24 | 342/118 |
| 7,408,501 B2 * | 8/2008 | Rolfes | G01F 23/284 | 340/612 |
| 7,525,476 B1 * | 4/2009 | Delin | G01S 7/4056 | 324/600 |
| 8,009,085 B2 * | 8/2011 | Kuhlow | G01F 23/284 | 324/600 |
| 8,332,182 B2 * | 12/2012 | Fehrenbach | G01F 23/28 | 702/166 |
| 8,717,222 B2 * | 5/2014 | Van Den Berg | B22D 11/041 | 342/124 |
| 2004/0119635 A1 * | 6/2004 | Edvardsson | G01F 23/284 | 342/124 |
| 2004/0145510 A1 * | 7/2004 | Edvardsson | G01F 23/284 | 342/5 |
| 2005/0134501 A1 * | 6/2005 | Spanke | G01F 23/2962 | 342/124 |
| 2005/0264440 A1 * | 12/2005 | Smith | G01F 25/0061 | 342/124 |
| 2009/0033543 A1 * | 2/2009 | Nilsson | G01F 23/284 | 342/124 |
| 2010/0017174 A1 * | 1/2010 | Lyon | G01F 23/284 | 703/2 |
| 2010/0019952 A1 * | 1/2010 | Poussin | B01J 8/0015 | 342/124 |
| 2010/0156702 A1 * | 6/2010 | Edvardsson | G01F 23/284 | 342/124 |
| 2010/0207807 A1 * | 8/2010 | Kuhlow | G01F 25/0061 | 342/124 |
| 2010/0256803 A1 * | 10/2010 | Cottard | B01J 8/002 | 700/218 |
| 2011/0109496 A1 * | 5/2011 | Van Den Berg | B22D 11/041 | 342/124 |
| 2012/0212365 A1 * | 8/2012 | Feil | G01S 13/42 | 342/107 |
| 2014/0028492 A1 * | 1/2014 | Mayer | G01F 23/284 | 342/124 |
| 2014/0091962 A1 * | 4/2014 | Lenk | G01F 23/284 | 342/5 |

FOREIGN PATENT DOCUMENTS

| | | |
|---|---|---|
| DE | 689 10 784 | 3/1994 |
| DE | 101 06 176 | 8/2002 |
| EP | 0 071 426 | 5/1989 |
| EP | 2 090 387 | 8/2009 |

* cited by examiner

RADAR BEAM DEFLECTION UNIT FOR A RADAR LEVEL INDICATOR

RELATED APPLICATIONS

This application claims the benefit of the filing date of European Patent Application Serial No. EP 13 180 386.8 filed 14 Aug. 2013, the disclosure of which is hereby incorporated herein by reference.

FIELD OF THE INVENTION

The invention relates to level measurement. In particular, the invention relates to a radar beam deflection unit for a radar level indicator, to a measuring instrument comprising a radar beam deflection unit, to the use of such a measuring instrument to determine a volume flow rate of a bulk solid, to the use of such a measuring instrument to determine the mass of a bulk solid, and to a method for determining the topology of a bulk solid.

TECHNICAL BACKGROUND

Bulk solids that are stored in a container, lie on a conveyor belt or sit on a waste heap usually have an irregular, uneven surface. In particular, the bulk solid can form into a cone or an extraction funnel can be formed.

In this situation, level indicators are often inaccurate in determining the level, in particular if they only measure the distance to a single point on the surface of the bulk material. In order to be able to determine the level with greater accuracy, it can be advantageous to use information about the surface topology of the bulk material.

The surface topology of a bulk material can be detected using a radar level indicator by changing the main beam direction of the antenna. By successive changes to the main beam direction it is possible to take measurements of the surface of a medium from different angular directions or from different positions. The detected echo curves can be used in the measuring instrument or in a suitable analysis unit to determine the surface topology.

The necessary change in the main beam direction can be performed mechanically by swivelling or displacing the antenna. It is also possible to provide an antenna array that detects echo curves from different spatial directions.

DE 101 06 176 A1 describes a level indicator having an adjustable detector head.

DE 689 10 784 T2 describes an antenna having an electronically controlled deflection system.

SUMMARY

A first aspect of the invention defines a radar beam deflection unit for a radar level indicator, which unit is designed to control the deflection of a main emission direction of a transmission signal emitted from the radar level indicator. The radar beam deflection unit comprises at least one first beam deflection element for deflecting the main emission direction of the transmission signal. This element is a prism, for instance. In addition, a first drive is provided, which is designed to rotate the first beam deflection element about a first axis of rotation so that the rotation of the first beam deflection element causes the main emission direction of the transmission signal after passing through the first beam deflection element to follow a closed path. For instance the closed path is a circular path.

In other words, main emission direction describes the primary direction of the transmission signal. After deflection, the beam, i.e. the transmission signal, is for example directed towards a surface of the bulk material, which surface may be uneven. When leaving the source, the main emission direction of the radar beam is directed towards the radar beam deflection element. When passing the radar beam deflection element, the main emission direction is directed towards the surface of the bulk material. By directing and/or deflecting the main emission direction of the transmission signal onto the surface of the bulk material, information about the topology of the bulk material can be obtained.

The main emission direction of the transmission signal may be continuously adapted and/or varied by continuously moving the radar beam defection element. Hence, the radar beam can be moved, for example by a drive, such that a closed line or path without interruptions on the surface can be followed. In other words, the point of impact, which describes the point on the surface of the bulk material at which the laser beam with a distinct main emission direction ends, can be moved or led over the surface of the bulk material continuously. In this manner, a closed path on the surface of the bulk material along which the radar beam is led over the surface can be achieved According to one embodiment of the invention, a second beam deflection element for deflecting the main emission direction of the transmission signal is provided in addition to the first beam deflection element. The second beam deflection element can also be a prism.

The term "prism" shall be understood to mean a body which is at least partially transparent to the transmission signal and which has two surfaces at an angle to each other and through which the transmission signal must pass on its way from the radar level indicator to the bulk material. Thus on its way through the beam deflection element, the signal is refracted at least once by these two surfaces with the result that the main emission direction is changed.

If the first or second beam deflection element is now rotated about its main axis by the drive of said element, the main emission direction of the transmission signal after passing through the beam deflection elements thus describes a closed path A second drive is provided for rotating the second beam deflection element. Thus both drives can be activated, whereby both prisms are rotated in the same direction or in opposite directions.

For example, the axis of rotation of the first prism and the axis of rotation of the second prism coincide. By suitable orientation of the faces of the two prisms with respect to each other and suitable adjustment of the speed and direction of rotation, the main emission direction of the transmission signal can move along a spiral path or, for instance, a flower-shaped path.

According to a further embodiment of the invention, a third drive can be provided in order to rotate the two prisms about a third axis of rotation that is perpendicular to the first axis of rotation and the second axis of rotation.

According to a further embodiment of the invention, the first beam deflection element has a first optical surface and a second optical surface which include an angle that defines the deflection of the main emission direction of the transmission signal in the manner known for a prism.

In particular, the first drive and the second drive can be designed as a mechanically coupled drive assembly. A suitable gear mechanism can be provided, which sets the ratio of the rotation frequency of the first prism with respect to the rotation frequency of the second prism.

According to a further embodiment of the invention, a ratio of a rotation frequency of the first beam deflection element with respect to a rotation frequency of the second beam deflection element is adjustable. The adjustment may be conducted by predefining different rotation frequencies of the beam deflection elements. For example, both drives are adapted to move the beam deflection elements with a predefined rotation frequency, for example by mechanically coupling them. A gear for the first drive and the second drive may be adapted such that the rotation frequency of the first beam deflection element with respect to the rotation frequency of the second beam deflection element can be adjusted. In this manner, a closed path with a specific pattern on the surface of the bulk material can be followed or scanned. Hence, the radar beam may continuously scan the surface of the bulk material so as to achieve propeller-shaped scan patterns or flower-shaped scan patterns on a closed path.

According to a further embodiment of the invention, the beam deflection elements comprise encoders, which detect at least the relative positions of the elements.

In particular, an absolute position of the beam deflection elements can also be determined.

A further aspect of the invention defines a measuring instrument comprising a radar beam deflection unit as described above and below.

The measuring instrument may be, for example, a pulse radar instrument, an FMCW measuring instrument (FMCW=frequency modulated continuous wave), an ultrasound measuring instrument or a laser measuring instrument.

The prism(s) may be made of Teflon or PE, for instance. Materials that have a different refractive index are also possible however. They can also be made of what is known as a metamaterial, which has a negative refractive index. In this case, with suitable design of the metamaterial, geometries other than a prism shape are also possible for the embodiments of the beam deflection unit.

According to a further embodiment of the invention, the measuring instrument comprises an attachment mechanism for attaching the radar beam deflection unit to the measuring instrument.

It should be mentioned at this point that if the measuring instrument is not a radar level indicator but an ultrasound measuring instrument, for instance, the beam deflection unit is designed not for deflecting radar beams but for the transmission and deflection of ultrasound signals. If the radiation source is a laser, the prisms are obviously designed to deflect the laser light.

In particular, the (radar) beam deflection unit can be attached to the housing of the measuring instrument and/or to the antenna thereof, thereby reducing the amount of time and effort involved in adjustment.

In particular, the measuring instrument can be designed to determine the topology of a bulk solid. This is achieved by rotating the prism(s) to scan the surface of the bulk solid with the transmission signal.

A further aspect of the invention defines the use of a measuring instrument as described above and below to determine a volume flow rate of a bulk solid lying on a conveyor belt.

A further aspect of the invention defines the use of a measuring instrument as described above and below to determine the mass of a bulk solid. Information about the topology is used in each case to determine the volume flow rate and the mass.

A further aspect of the invention defines a method for determining the topology of a bulk solid, in which method firstly a transmission signal from a level indicator is transmitted in a main emission direction of an antenna array. The level indicator, for example, is a radar level indicator, a laser measuring instrument or an ultrasound measuring instrument. A first prism is then rotated about a first axis of rotation so that the main emission direction of the transmission signal after passing through the prism follows a closed path. In addition, a second prism can be rotated about the same axis of rotation either in the same direction of rotation as the first prism or in the opposite direction of rotation to the first prism. The speeds of rotation can be different, so that the main emission direction of the transmission signal after passing through both prisms follows a complicated path, for instance a spiral or flower-shaped path, which may be closed.

The transmission signals are reflected at the surface of the bulk solid, and the reflected signals pass through the prism(s) again and are then detected by the level indicator. The topology of the bulk solid can then be calculated by analysing the detected reflected transmission signals.

Embodiments of the invention are described below with reference to the figures.

DETAILED DESCRIPTION OF EMBODIMENTS

Figure 1A:
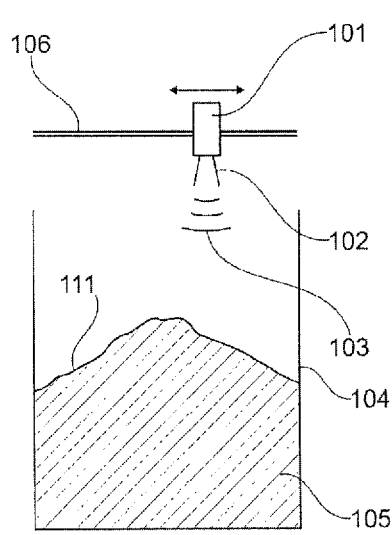
FIG. 1A shows a level-measurement arrangement.

The depictions in the figures are schematic and not to scale.

Where the same reference numerals are used in different figures in the following description of the figures, they denote the same or similar elements. The same or similar elements may also be denoted by different reference numerals, however.

The present invention is used in particular in the field of level indicators, although it may also be possible to use the invention in the area of object monitoring or mass flow-rate measurement. A core aspect of the invention can be considered to be that of broadening level-measurement methods which only determine the distance to a single point on a bulk-material surface in such a way that it is possible to detect the topology of a surface This can achieve far better measurement results especially in bulk-solid applications, regardless of what means shall be used in additional computation steps to analyse the topology data.

There are mechanical, optical and electrical solutions to achieving the change in the main emission direction of the transmission signal, which change is needed to determine the topology.

A mechanical solution, for instance, can be implemented using a travelling antenna or a level indicator that can travel as a whole unit, as shown in FIG. 1A. Retrofitting such a measurement arrangement in an existing container, however, is usually not possible through the available container opening, and requires a large distance of travel for the antenna equal to the measurement area.

The measuring instrument 101, which is a radar level indicator, an ultrasound measuring instrument or a laser measuring instrument, for instance, comprises a transmission-signal emission apparatus, for instance in the case of the radar system in the form of a horn antenna or parabolic antenna 102. The transmission signal 103 is emitted towards the bulk-material surface 111 and reflected at least partially there.

The bulk material 105, which may be a bulk solid, for instance, is typically located in a container 104 or on a conveyor belt. The transmission signal reflected from the bulk-solid surface 111 of the bulk solid 105 is then detected by the measuring instrument by means of the antenna 102 and analysed.

In the example in FIG. 1A, the measuring instrument 101 can be moved along the horizontal guide 106, with the result that the bulk-solid surface can be scanned at least in one dimension.

Figure 1B:
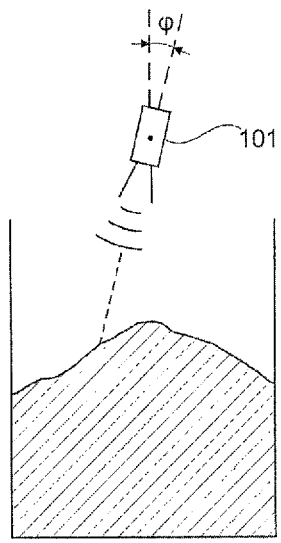
FIG. 1B shows a further level-measurement arrangement.

A further option for scanning the bulk-material surface is to mechanically pivot an antenna that is otherwise fixed in position, as shown in FIG. 1B. The mechanical stress on the antenna cables required for the power supply and signal transmission can prove a problem in this case, however, because of the rapid rotation of the antenna that is required.

Figure 1C:
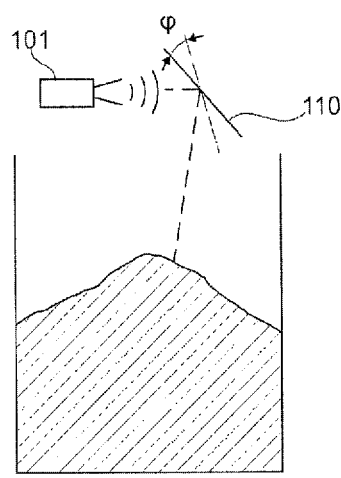
FIG. 1C shows a further level-measurement arrangement.

This can be avoided by decoupling the beam generation from the mechanical deflection of the main beam direction, which can be achieved, for instance, by a fixed antenna and a suitable pivoting mirror 110. An example of this is shown in FIG. 1C. The lateral arrangement of the mirror makes it impossible to have a compact construction and for the installation to fit through a container opening measuring only 6 inches, for instance.

A purely electrical beam deflection system can be implemented, for example, using patch array antennas. This is associated with costly and complex circuitry, however. Furthermore, the beam quality (focusing including side lobes) that can be achieved in this case is far worse than the beam quality achievable with a Cassegrain antenna, for instance.

According to one aspect of the invention, beam generation is decoupled from the mechanical deflection of the main beam direction while retaining a compact design.

Figure 1D:
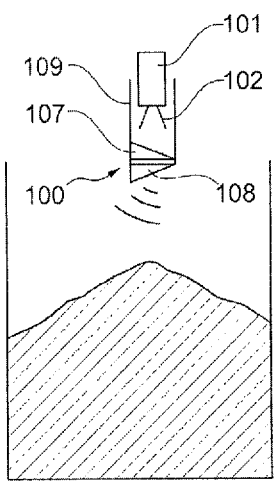
FIG. 1D shows a level-measurement arrangement according to an embodiment of the invention.
Figure 2:
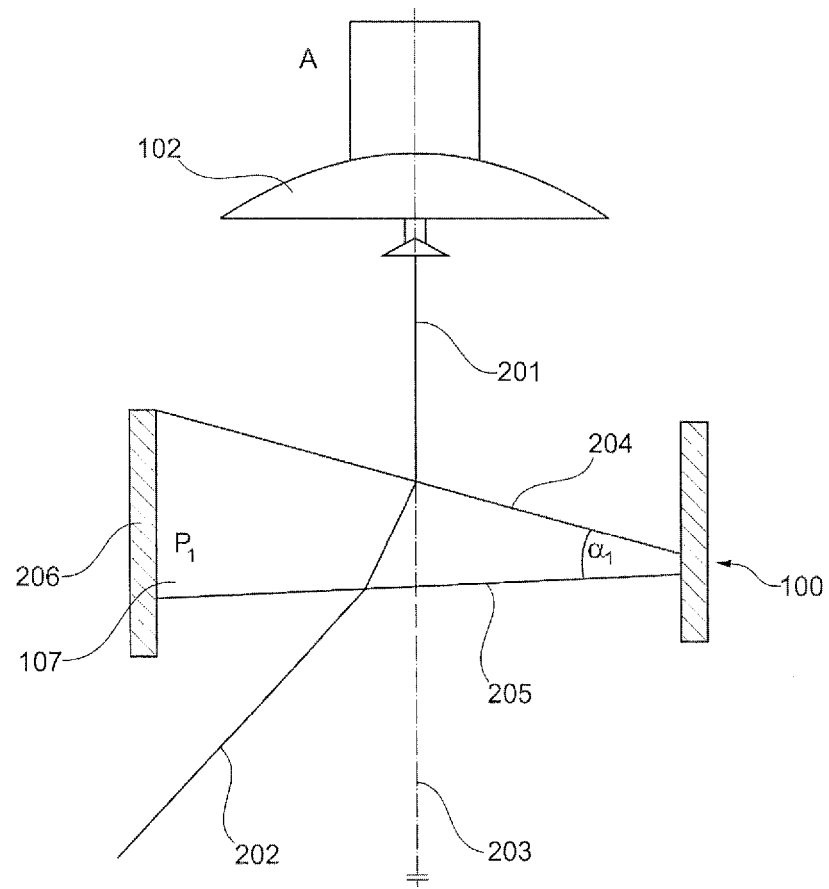
FIG. 2 shows a level-measurement arrangement according to a further embodiment of the invention.

FIGS. 1D and 2 show two embodiments of the invention. These embodiments involve an arrangement for a level indicator 101 (for instance a radar level indicator) having an antenna (A) 102 and at least one beam deflection element ($P_1$) 107, 108, for example in the form of a prism, which is located in the main beam direction 201 of the antenna 102.

The prism has an angle $\alpha_1$ between the two refractive faces 204, 205 and is made of at least one material ($M_1$), for example PTFE (Teflon). By using additional materials, for instance for a surface finish, that have properties that differ from $M_1$, it is possible to influence additional properties such as reflection and transmission properties or the chromatic aberration of the beam deflection element.

A suitable drive can be used to skew the beam deflection element $P_1$ with respect to the antenna 102 along the main beam direction and thus to deflect the main beam direction thereof onto a surface of a cone in accordance with the optical paths of different lengths in the beam deflection element. The cone angle here depends on the prism angle $\alpha_1$.

Figure 4:
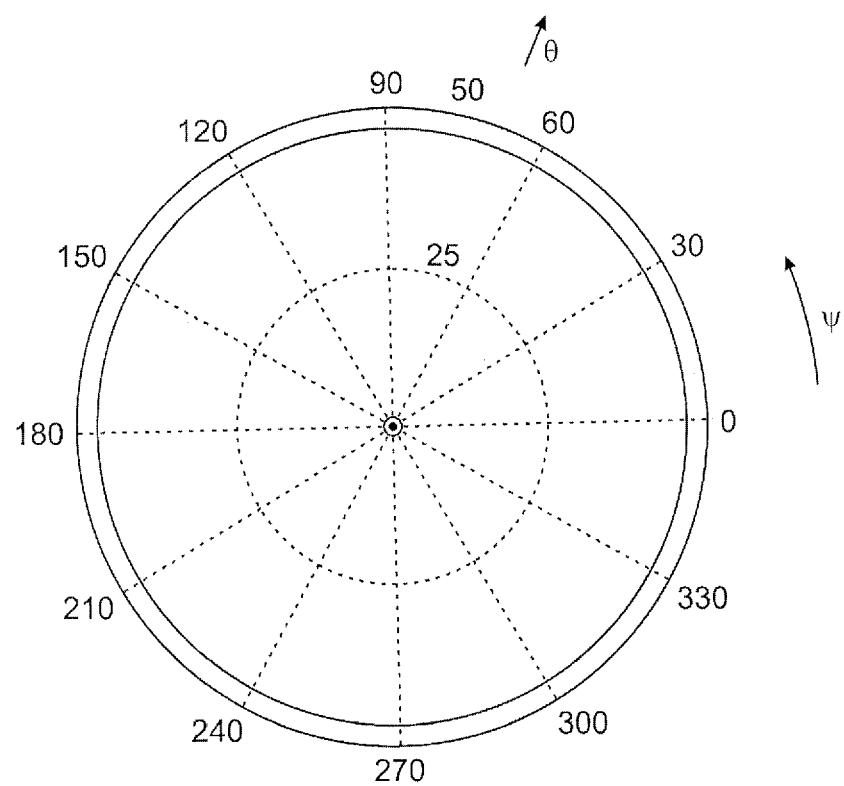
FIG. 4 shows a possible scan area that the transmission signal can scan.

FIG. 4 shows the scan area that can be achieved by this means. It can be seen in FIG. 4 that the azimuth angle $\Psi$ can be 0 to 360 degrees. The pitch angle $\Theta$ can equal 0 to 50 degrees, for example, depending on the choice of material from which the prisms are made, and on $\alpha_1$ and $\alpha_2$.

The prism(s) 107, 108 can be located in a shared housing 109 that is placed over the housing of the measuring instrument 101 and the antenna 102 thereof. The beam deflection unit 100 can thereby be attached directly to the housing of the measuring instrument 101 and/or the antenna 102 thereof. In particular, the housing of the measuring instrument 101 is designed to be integral with the housing 109 of the beam deflection unit 100.

FIG. 2 shows an embodiment in which the antenna is designed as a parabolic antenna 102. The reference numeral 201 indicates the main emission direction of the transmission signal directly after leaving the antenna. The main emission direction lies on the main axis 203 of the first prism. If the transmission signal is incident on the first optical surface 204 of the first prism 107, it is refracted away from the main axis 203 of the first prism 107. Then the transmission signal is incident on the second optical surface 205 of the prism and is again refracted away from the main axis 203 of the prism (see beam direction 202).

Figure 3A:
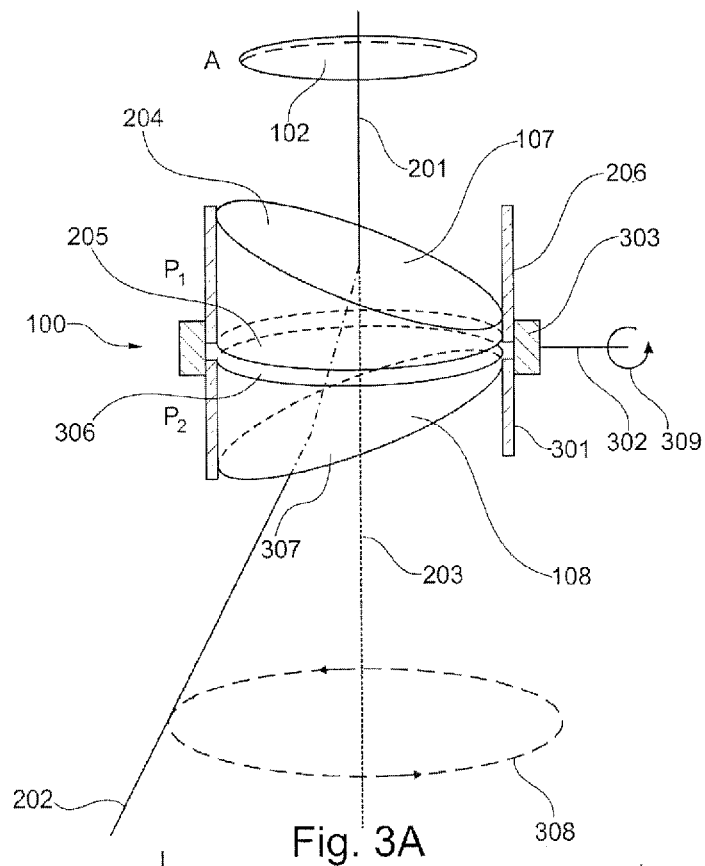
FIG. 3A shows a level-measurement arrangement according to a further embodiment of the invention.

The prism 107 can be rotated about the main axis 203 by a drive unit 206, which may be a torque motor for instance. FIG. 3A shows the arrangement of two prisms 107, 108, similar to that shown in FIG. 1D. The optical surface 204 of the first prism 107, which surface faces the antenna 102, makes an angle $\alpha_1$ to the axis of rotation 203 of the two prisms that is not equal to 90 degrees, with the result that the transmission signal is refracted away from the optical axis 203 when it passes through the first surface 204. The second, rear surface 205 of the first prism, on the other hand, is orientated perpendicular to the axis of rotation 203, as is the first surface 306 of the second prism 108, which surface is opposite this second, rear surface. Thus overall, the main emission direction of the transmission signal does not change when the transmission signal travels from the first prism into the second prism, in particular if the distance between the two prisms is small enough.

The rear second optical surface 307 of the second prism 108 makes an angle $\alpha_2$ to the main axis 203 of the two prisms so that the main emission direction changes again when the transmission signal exits the second prism.

Both prisms can have different drives 206, 301, which can be controlled and operated independently of one another. The second prism, however, can also be coupled to the drive of the first prism for instance by a gear mechanism, with the result that the ratio of the rotation frequencies of the two prisms is fixed in advance.

In addition, a third drive unit 303 can be provided that enables both prisms to be able to be rotated about the axis of 302 perpendicular to the main axis 203 (cf. arrow 309). In this case, a scan pattern can be generated that is not radially symmetric.

Rotating the two prisms about the main axis 203 causes the main emission direction 202 after passing through the two prisms to move along a circular path 308, for example. This is the case when the two prisms are rotated with the same rotation frequency in the same direction.

The two prisms, however, can also be rotated in opposite directions to each other and/or at different frequencies. An example of the two extreme positions for the prisms and the resultant beam deflection is shown in FIGS. 3B and 3C.

Figure 3B:
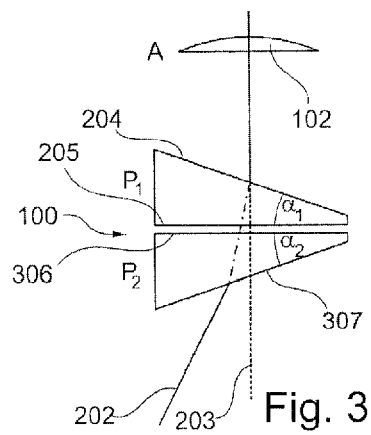
FIGS. 3B and 3C show a level-measurement arrangement according to a further embodiment of the invention.

In the case shown in FIG. 3B, in which the angle between the first surface 204 of the first prism and the second surface 307 of the second prism is $\alpha_1+\alpha_2$ and is not equal to 0 degrees, the transmission signal experiences maximum refraction away from the main axis 203 in the direction 202.

Figure 3C:
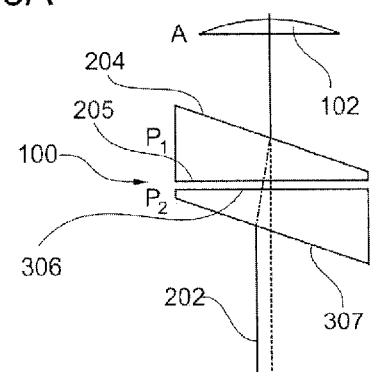

In the case shown in FIG. 3C, on the other hand, the top faces 204, 307 of the first prism and of the second prism are arranged parallel to one another. The two other faces 205, 306 are likewise arranged parallel to one another, which moreover is also the case in the embodiments in FIGS. 1D, 3A and 3B.

This results in the direction 202 of the transmission signal, after passing through the two prisms, running parallel but offset to the main axis 203 of the two prisms.

A further degree of deflection freedom can be obtained by combining with a second such prism ($P_2$) (cf. FIG. 3A). FIG. 3B shows the maximum possible deflection. In this case, the two beam deflection elements have an identical orientation, that is to say are rotated through 0° with respect to each other. If both beam deflection elements face each another (cf. FIG. 3C), this results simply in a parallel beam offset but with no angular deflection of the main beam direction of the antenna A.

A spiral scan can be realised by a coupled rotation of the two prisms, which might be achieved by means of a planetary gear mechanism, for instance. The precise form of the scan is set here by the transmission ratio of the gear mechanism. While the prism $P_1$ facing the antenna rotates $m_1$ times, the prism $P_2$ makes $m_2$ revolutions. This gives a transmission ratio of the gear mechanism of $m=m_1/m_2$.

Figure 5A:
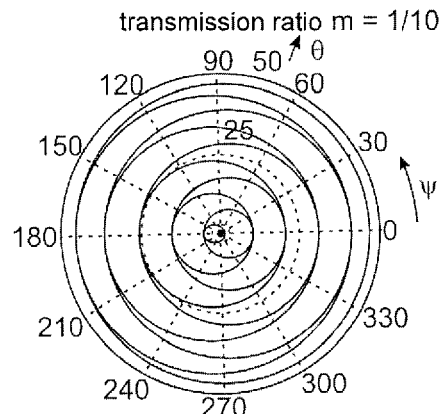
FIG. 5A to 5F show various trajectories or paths along which the main emission direction of the transmission signal can move after passing through the prisms.
Figure 5B:
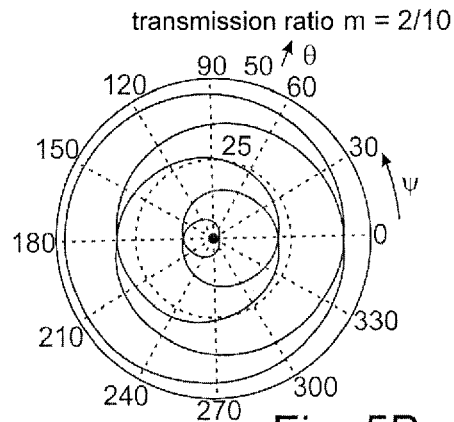
Figure 5C:
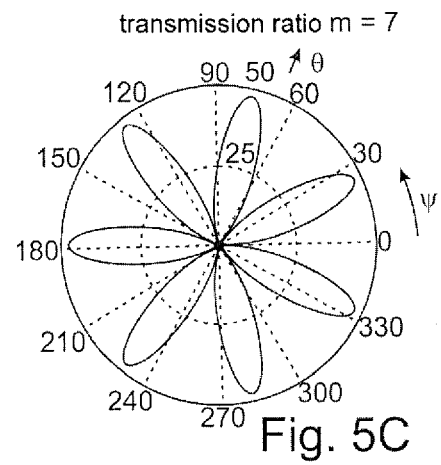
Figure 5D:
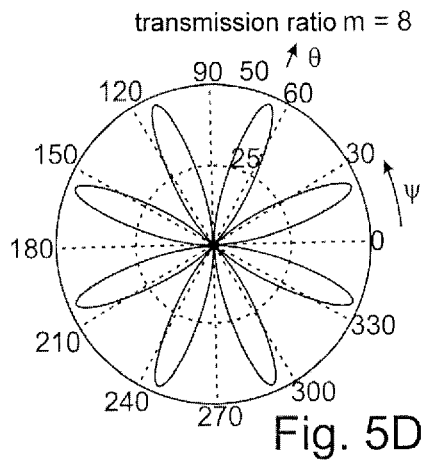
Figure 5E:
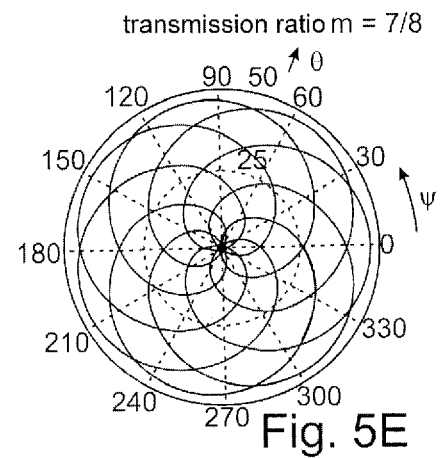
Figure 5F:
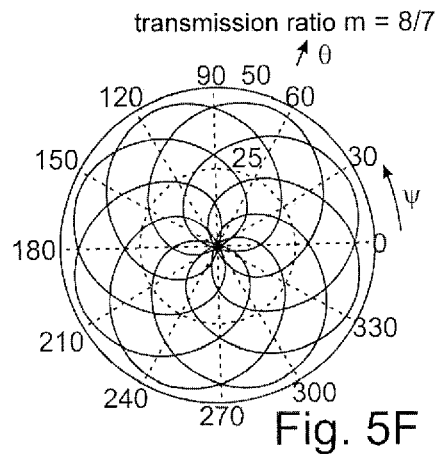

Small rational-number ratios produce spiral scan patterns, as shown in the polar diagrams in FIGS. 5A and 5B. In this case, the pitch angle $\Theta$ of the beam deflected from the main beam direction is plotted against the azimuth angle $\Psi$ (also known as the yaw angle). Ratios that are whole numbers produce propeller-shaped scan figures (see FIGS. 5C and 5D), whereas ratios that are rational numbers close to 1 result in flower-shaped scan patterns (see FIGS. 5E and 5F).

In addition, however, it is also possible to provide any other transmission ratios or even decoupled movement of the two beam deflection elements. Flower-shaped scan patterns can be advantageous here because they cover the surface under investigation relatively evenly with measurement points.

Figure 6:
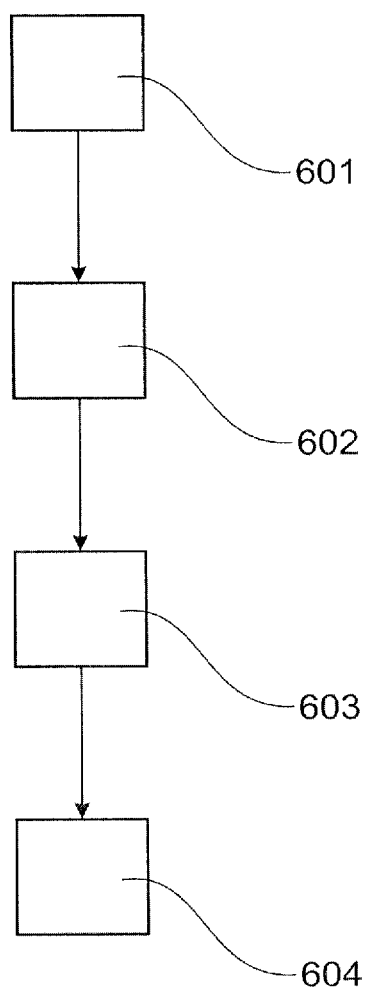
FIG. 6 shows a flow diagram of a method according to an embodiment of the invention.

FIG. 6 shows a flow diagram of a method according to an embodiment of the invention.

In step 601, a transmission signal is transmitted by a measuring instrument towards the bulk-material surface. In step 602, the transmission signal passes through at least one prism, which is rotated about its main axis so that the main emission direction of the transmission signal is deflected cyclically. The transmission signal is then reflected by the bulk-material surface, again passing through the at least one prism on its way back to the level indicator. In step 603, the reflected transmission signal is detected and analysed by the level indicator in order to determine therefrom, in step 604, the topology of the bulk-material surface.

In addition, it should be mentioned that the terms "comprising" and "having" do not exclude any other elements or steps, and "a" or "an" does not rule out more than one. It should also be pointed out that features or steps that have been described with reference to one of the above embodiments can also be used in combination with other features or steps of other embodiments described above. Reference symbols in the claims shall not be deemed to have a limiting effect.

The invention claimed is:

1. A radar beam deflection unit for a radar level indicator for controlling the deflection of a main emission direction of a transmission signal emitted from the radar level indicator, comprising:
   a first beam deflection element deflecting the main emission direction of the transmission signal;
   a first drive rotating the first beam deflection element about a first axis of rotation, with the result that the main emission direction of the transmission signal after passing through the first beam deflection element follows a closed path;
   a second beam deflection element deflecting the main emission direction of the transmission signal, after it has passed through the first beam deflection element; and
   a second drive rotating the second beam deflection element about a second axis of rotation, with the result that the main emission direction of the transmission signal after passing through the first and second beam deflection elements follows a closed path.

2. The radar beam deflection unit according to claim 1, wherein the axis of rotation of the first beam deflection element and the axis of rotation of the second beam deflection element coincide.

3. The radar beam deflection unit according to claim 1, further comprising:
   a third drive for rotating the first beam deflection element and/or the second beam deflection element about a third axis of rotation that is perpendicular to the first axis of rotation and the second axis of rotation.

4. The radar beam deflection unit according to claim 1, wherein the first beam deflection element has a first optical surface and a second optical surface which include an angle that defines the deflection of the main emission direction.

5. The radar beam deflection unit according to claim 1, wherein the first drive and the second drive are designed as a mechanically coupled drive.

6. The radar beam deflection unit according to claim 1, wherein a ratio of a rotation frequency of the first beam deflection element with respect to a rotation frequency of the second beam deflection element is adjustable.

7. A measuring instrument, comprising:
   a radar beam deflection unit controlling a deflection of a main emission direction of a transmission signal emitted from a radar level indicator, the radar beam deflection unit including a first beam deflection element deflecting the main emission direction of the transmission signal; and a first drive rotating the first beam deflection element about a first axis of rotation, with the result that the main emission direction of the transmission signal after passing through the first beam deflection element follows a closed path, the radar beam deflection unit further including a second beam deflection element deflecting the main emission direction of the transmission signal, after it has passed through the first beam deflection element and a second drive rotating the second beam deflection element about a second axis of rotation, with the result that the main emission direction of the transmission signal after passing through the first and second beam deflection elements follows a closed path.

8. The measuring instrument according to claim 7, comprising:
   an attachment mechanism for attaching the radar beam deflection unit to the measuring instrument.

9. The measuring instrument according to claim 7, wherein the measuring instrument is embodied as a pulse radar instrument or FMCW measuring instrument.

10. The measuring instrument according to claim 7, the measuring instrument determines a topography of a bulk solid.

11. A method for determining the topology of a bulk solid, comprising the steps:
   transmitting a transmission signal from a radar level indicator in a main emission direction of an antenna array;

deflecting the main emission direction of the transmission signal;

rotating a first beam deflection element about a first axis of rotation so that the main emission direction of the transmission signal after passing through the first beam deflection element follows a closed path;

rotating a second beam deflection element about a second axis of rotation so that the main emission direction of the transmission signal after passing through the first and second beam deflection element follows a closed path; and determining the topology of the bulk solid by analysing the transmission signal reflected at the bulk-solid surface.

* * * * *